United States Patent
Hornsby

(10) Patent No.: US 7,039,167 B2
(45) Date of Patent: May 2, 2006

(54) CALL ROUTING SYSTEM AND METHOD

(75) Inventor: William Darin Hornsby, Richmond, VA (US)

(73) Assignee: Capitol One Financial Corporation, McLean, VA (US)

( * ) Notice: Subject to any disclaimer, the term of this patent is extended or adjusted under 35 U.S.C. 154(b) by 270 days.

(21) Appl. No.: 10/116,402

(22) Filed: Apr. 4, 2002

(65) Prior Publication Data
US 2003/0190021 A1   Oct. 9, 2003

(51) Int. Cl.
*H04M 1/64* (2006.01)

(52) U.S. Cl. .............................. 379/88.23; 379/88.21; 705/42

(58) Field of Classification Search .............................. 379/114.14–114.17, 114.9, 114.2, 88.16, 379/88.18; 705/42, 44
See application file for complete search history.

(56) References Cited

U.S. PATENT DOCUMENTS

| | | | | |
|---|---|---|---|---|
| 5,500,513 A | * | 3/1996 | Langhans et al. | 235/380 |
| 5,699,528 A | * | 12/1997 | Hogan | 705/40 |
| 5,708,422 A | * | 1/1998 | Blonder et al. | 340/5.41 |
| 5,819,226 A | * | 10/1998 | Gopinathan et al. | 705/44 |
| 5,825,856 A | * | 10/1998 | Porter et al. | 379/93.12 |
| 5,825,881 A | * | 10/1998 | Colvin, Sr. | 705/78 |
| 6,167,387 A | * | 12/2000 | Lee-Wai-Yin | 705/41 |
| 6,169,787 B1 | * | 1/2001 | Shimada et al. | 379/91.01 |
| 6,230,145 B1 | * | 5/2001 | Verderamo et al. | 705/35 |
| 6,295,344 B1 | * | 9/2001 | Marshall | 379/114.14 |
| 6,327,363 B1 | * | 12/2001 | Henderson et al. | 379/265.01 |
| 6,473,500 B1 | * | 10/2002 | Risafi et al. | 379/144.01 |
| 6,516,056 B1 | * | 2/2003 | Justice et al. | 379/145 |
| 2002/0040344 A1 | * | 4/2002 | Preiser et al. | |
| 2004/0078328 A1 | * | 4/2004 | Talbert et al. | |

OTHER PUBLICATIONS

Intouch Communications NA, "Credit Card Processing & Merchant Account Glossary", http://www.edr-payment-services.com/home/merchant_account_glossary.htm, pp. 1-8.

* cited by examiner

*Primary Examiner*—Fan Tsang
*Assistant Examiner*—Simon Sing
(74) *Attorney, Agent, or Firm*—Baker & McKenzie LLP

(57) ABSTRACT

System and method for providing at least one predetermined automated message to an account holder via a voice response unit based on a likely reason for the call by the account holder to be because of a recent transaction decline.

14 Claims, 2 Drawing Sheets

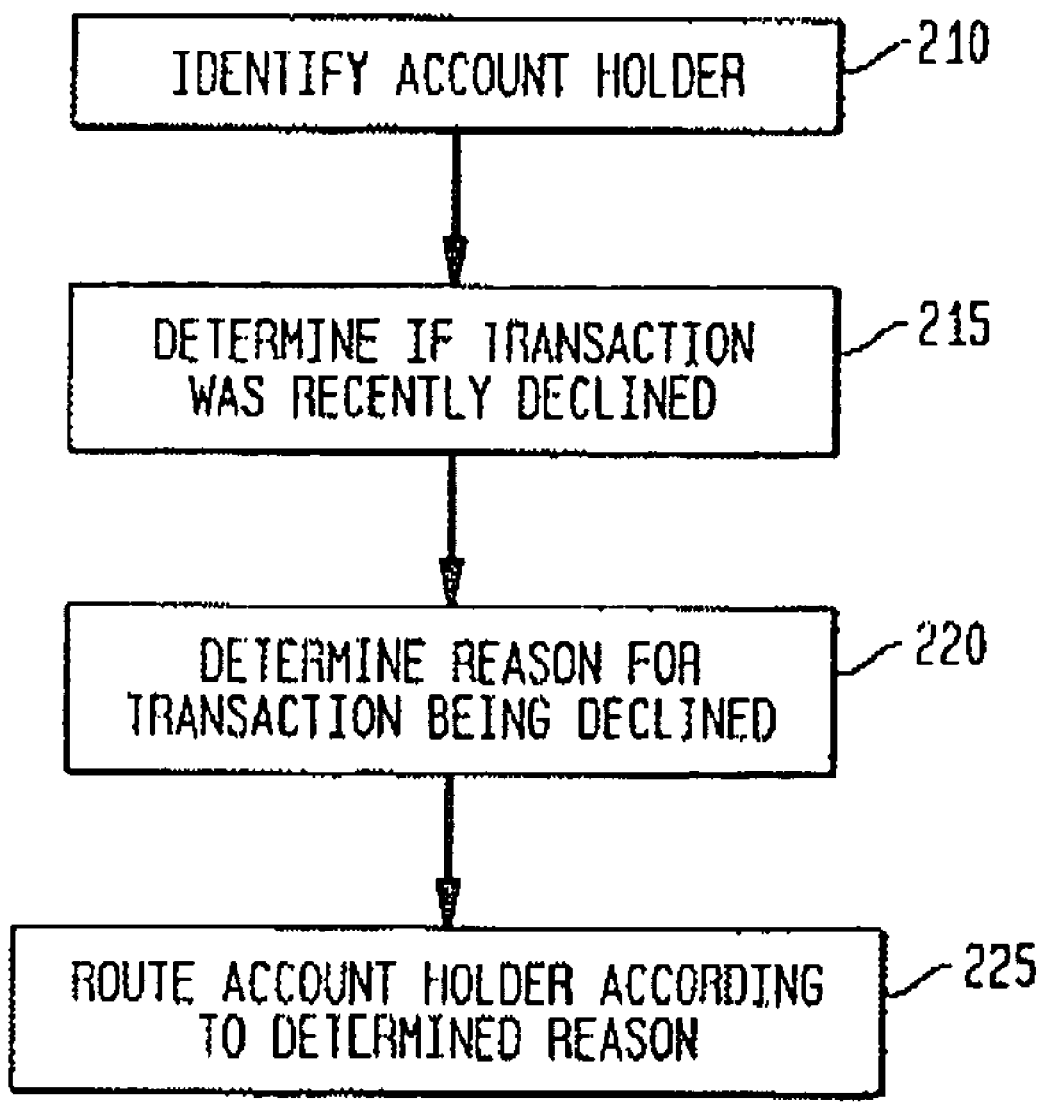

CALL ROUTING SYSTEM AND METHOD

FIELD

The present application relates to a call routing system and method and, more particularly, to a system and a method that tailors at least one predetermined automatic message transmitted to an account holder based on a likely reason for the call.

BACKGROUND

Voice response units enable users to access information using a conventional telephone. The interaction between the users and the voice response unit includes various voice prompts output by the voice response unit and responses thereto, for example, via the telephone keypad, by the user. Voice response units are used by service providers, such as banks and credit card companies, to fully or partially automate telephone call answering or responding to queries. Typically a voice response unit provides the capability to play voice prompts including recorded voice segments or speech synthesized from text and to receive responses thereto. The voice prompts are generally organized in the form of voice menus invoked by state tables. A state table can access and play a voice segment or synthesize speech from given text. The prompts are usually part of a voice application that is designed to, for example, allow a user to query information associated with their various accounts.

Further, voice response units are used in a variety of applications today to resolve customer problems and questions in conjunction with customer service representatives. In a financial service industry, such voice response units often provide users general information via one or more automated messages. Usually, the user is also given the option to either bypass an automated message or after the automated message has concluded to interact with a customer service representative in order to receive more detailed information tailored to an account of the user.

For example, an account holder may present his or her card, such as a debit card, an automated teller machine ("ATM") card, a credit card or a smart card, to a merchant or to an ATM only to have the transaction denied. The merchant or the ATM may or may not give a reason for the declined transaction. In any event, even if a reason is given, the reason tends to be insufficient. Thus, the account holder thereafter contacts the respective company administering the card and, more particularly, the voice response unit of the respective company, to determine, for instance, why the transaction was denied and/or how to eliminate such an occurrence from happening again. The account holder receives very little information, if any, from the automated messages provided by the voice response unit, but rather must speak with a customer service representative to receive information about the recently declined transaction. As a result, since such account holders would rather speak with a customer service representative because the information provided via automated messages is not sufficient, the appropriate action cannot be taken through interaction with automated messages and/or lack of patience navigating through several automated messages to find out the necessary information, there is an overload of calls that must be serviced by customer service representatives. Consequently, companies, such as credit card companies, incur tremendous expenses in having to handle these calls with customer service representatives, as opposed to having the calls handled solely through the voice response unit.

Accordingly, a need exist for a system and a method which presumes a caller has contacted a voice response unit because of a recent transaction decline and, as a result, routes the caller along a predetermined path of automated messages tailored to the specific reason for the transaction decline.

SUMMARY OF THE INVENTION

An aspect of the present application provides for a call routing method. The call routing method includes identifying an account holder accessing a voice response unit, the account holder having an account, determining whether a transaction associated with the account was declined within a predetermined period of time, after determining the identity of the account holder, determining a reason for the transaction being declined if the transaction associated with the account was determined to be declined within the predetermined period of time, and routing the account holder to at least one predetermined automated message provided by the voice response unit based on the reason for the transaction being declined, wherein the at least one predetermined automated message informs the account holder of the reason for the transaction being declined.

Another aspect of the present application provides for a call routing method. The call routing method includes identifying an account holder accessing a voice response unit, the account holder having an account, determining whether a transaction associated with the account was declined within a predetermined period of time, after determining the identity of the account holder, by determining when the account holder accessed the voice response unit, searching at least one memory unit for first data associated with the account indicating whether the transaction was declined and, if the transaction was declined, indicting when the transaction was declined, searching the at least one memory unit for second data indicating the predetermined period of time, and determining according to the first data and the second data whether the transaction was declined within the predetermined period of time of when the account holder accessed the voice response unit, determining a reason for the transaction being declined if the transaction associated with the account was determined to be declined within the predetermined period of time by searching at least one memory unit for decline data includes a decline code, the decline data being associated with account data for the account holder and the decline code indicating the reason for the transaction being declined, and routing the account holder to at least one predetermined automated message provided by the voice response unit based on the reason for the transaction being declined, wherein the at least one predetermined automated message informs the account holder of the reason for the transaction being declined.

A further aspect of the present application provides for call routing system, including a communication device operable by an account holder having an account, a voice response unit coupled to the communication device for interacting with the account holder when using the communication device, a memory unit for storing account data, decline data and data indicating a predetermined period of time, and a processing unit coupled to the voice response unit and coupled to the memory unit, the processing unit determining the identity of the account holder according to an inputted account number and the account data stored in the memory unit, searching the memory unit for the decline data associated with the account, determining if a transaction associated with the account was declined within a predetermined period of time according to the decline data, determining a reason for the transaction being declined according to a decline code of the decline data, and instructing the voice response unit to provide at least one predetermined automated message to the account holder if it is determined that the transaction was declined, wherein the at least one predetermined automated message informs the account holder of the reason for the transaction being declined.

BRIEF DESCRIPTION OF THE DRAWINGS

FIG. 2 illustrates an exemplary call routing method of the present application.

DETAILED DESCRIPTION

Figure 1:
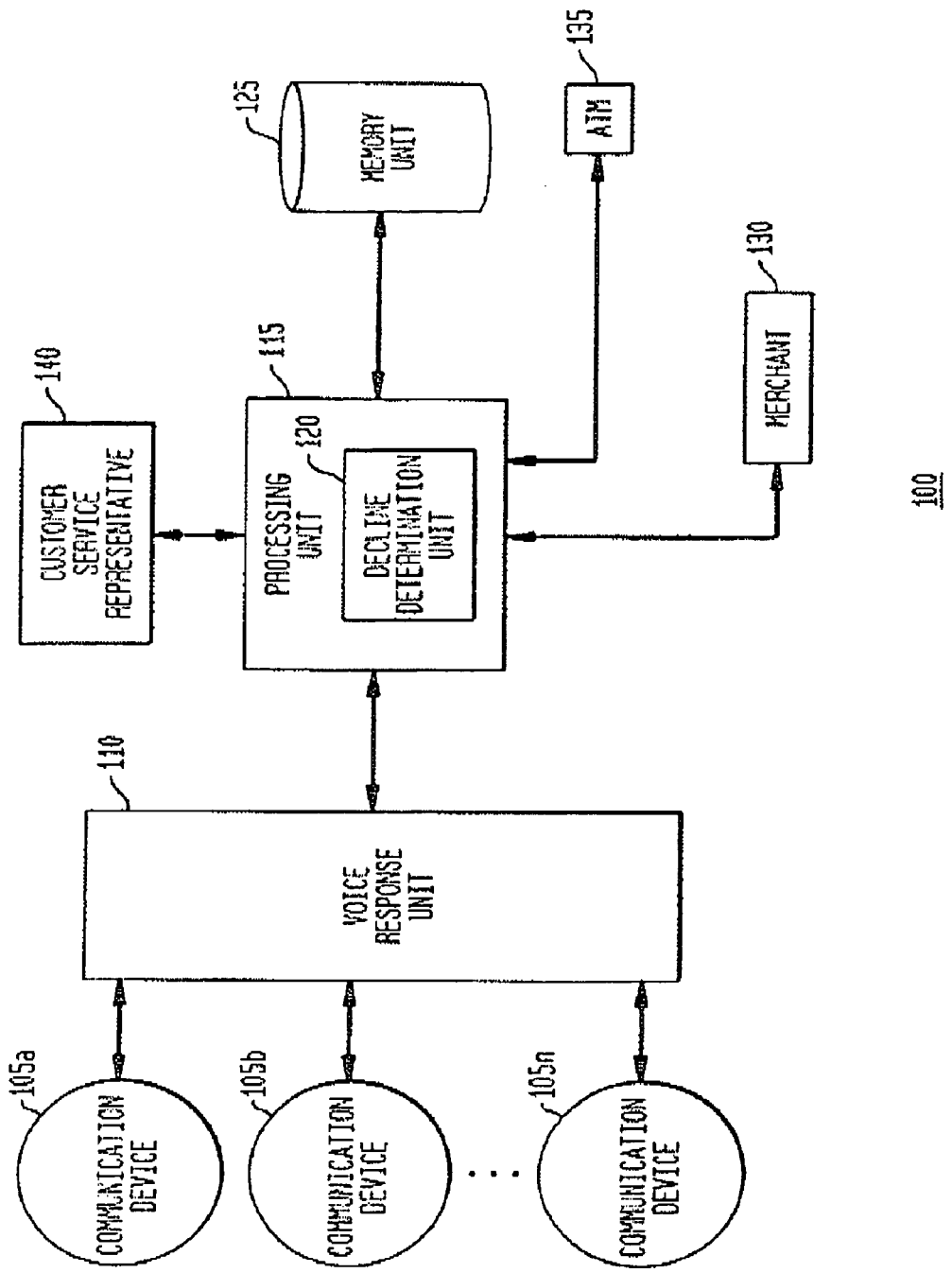
FIG. 1 illustrates an exemplary call routing system of the present application.

The exemplary embodiments of the present application are described with reference to an account holder having an account and at least one associated card linked to the account. The account holder can use the card, for example, to make a purchase at or with a merchant and/or can withdraw money from an ATM. The present application is equally applicable to credit cards, debit cards, ATM cards and smart cards and their associated accounts and, thus, is not meant to be limited to any particular type of card and account. As is well known in the art, some transactions can be conducted without presenting a physical card. Rather, an account holder can present a predetermined number associated with an account to perform a transaction. Further, cards can be administered by various companies, such as banks, credit card companies or other institutions.

In FIG. 1, an exemplary call routing system 100 is shown. Call routing system 100 includes a plurality of communication devices 105a . . . 105n, voice response unit 110, processing unit 115 including decline determination unit 120 and memory unit 125. Communication devices 105a . . . 105n can be wired or wireless telephones and/or network connections, for example, Internet connections, via a wireless or wired transmission link to transmit information to and to receive information from voice response unit 110. Other communication devices can also be used by account holders. Further, memory unit 125 can include various types of memory storage devices, for example, one or more databases. Memory unit 125 stores, for example, account data regarding an account holder and at least one associated account and decline data.

Merchant 130, ATM 135 and customer service representative 140 are also coupled to processing unit 115. An account holder can make a purchase at or with merchant 130 using a card and information is transmitted to and from processing unit 115 regarding the transaction. Additionally, an account holder can withdraw money from ATM 135 and can transmit other account-related transactions or inquiries to processing unit 115 via ATM 135. Customer service representative 140 is accessible to account holders either through voice response unit 110 or by direct dialing.

The components of FIG. 1 may be implemented through hardware, software, and/or firmware. Further, the number of components in call routing system 100 is not limited to what is illustrated.

FIG. 2 illustrates an exemplary call routing method of the present application. In the call routing method shown in FIG. 2, an account holder is informed via one or more automated messages from voice response unit 110 of at least one reason why an attempted transaction by the account holder was declined. The call routing method of the present application presumes a caller has contacted voice response unit 110 because of a recently declined transaction as described below and routes the account holder along a predetermined path or paths of one or more automated messages tailored to the specific reason for the declined transaction.

An account holder presents a card or a predetermined number to merchant 130 to make a purchase or inputs a card at ATM 135 in order to access an account. As is well known in the art, point of sale purchases can be made over the telephone, using the Internet or in-person. Merchant 130 or ATM 135 transmits data associated with the card to processing unit 115 so that processing unit 115 can determine whether an attempted transaction is valid. Specifically, decline determination unit 120 of processing unit 115 determines whether the attempted transaction is valid or declined. Processing unit 115 transmits data back to merchant 130 or ATM 135 indicating either that the attempted transaction is valid or that the attempted transaction is invalid and, thus, declined. If the attempted transaction is declined by decline determination unit 120, merchant 130 or ATM 135 receives decline data from processing unit 115 and merchant 130 or ATM 135 notifies the account holder of the decline. Merchant 130 or ATM 135 may or may not inform the account holder of the reason for the decline. As a result, the account holder is unable to consummate the transaction using the card or the predetermined number and may not even know why.

A transaction is declined by decline determination unit 120 for at least one of a variety of reasons, including insufficient funds, an inadvertent error by the merchant and/or the company administering the card, a restriction on an account, reaching a maximum ATM withdrawal limit, delinquency and reaching miscellaneous account limits. Moreover, the transaction may be declined by decline determination unit 120 when fraud is detected or suspected.

In an exemplary embodiment, decline data is generated by decline determination unit 120 and is stored in memory unit 125 with account data or in association with the respective account data for the account. Decline data includes at least one decline code indicating a reason why the attempted transaction was declined and data indicating when the transaction was declined, for example, the time and date. In an exemplary embodiment, a table of codes is stored at merchant 130 and ATM 135 and when a processing unit at merchant 130 and ATM 135 receives a decline code from processing unit 115, the processing unit at merchant 130 and ATM 135 looks up the decline code in the table of codes. One or more actions to take depending on the decline code can also be stored at merchant 130 and ATM 135, for instance, in a relational database. Alternatively, the table of codes is stored with the company administering the card, for instance, in memory unit 125, or the table of codes is stored with merchant 130 and ATM 135 and with the company administering the card. Account data is also stored in memory unit 125. Account data includes one or more of the following: an account holder's name; residence; telephone number(s); social security number; account number(s); personal identification number; account balance data; and various other data regarding the account and the account holder. The type, quality and quantity of data stored in memory unit 125 depend on the type of account.

Thereafter, the account holder using, for instance, communication device 105a, establishes a connection to voice response unit 110 associated with the company administering the account. The account holder may contact the company for an explanation why the transaction was declined and/or for any number of other account-related reasons. When a connection has been established, the account holder's identity is determined, in 210. In an exemplary embodiment, the identity of the account holder is determined from an account number input by the account holder in response to a prompt by voice response unit 110. The inputted account number is transmitted from voice response unit 110 to processing unit 115, processing unit 115 then matching the inputted account number to one of a plurality of account numbers stored in memory unit 125. If the inputted account number matches an account number stored in memory unit 125, the respective account data is retrieved from memory unit 125 by processing unit 115. The account data identifies the account holder. Various other techniques well known in the art can be used in place of or in conjunction with the above-described technique of identifying an account holder calling into a voice response unit or accessing an Internet web page/web site.

Once the account holder is identified, in 210, processing unit 115 coupled to voice response unit 110 then determines a likely reason for the call by the account holder. In particular, processing unit 115 determines if a transaction associated with an account of the account holder was recently declined by decline determination unit 120 within a predetermined period of time, for instance, within twenty-four or forty-eight hours of the call, in 215. The declined transaction may have been attempted by the account holder, someone authorized to conduct a transaction on behalf of the account holder or an unauthorized individual. Processing unit 115 searches memory unit 125 for any decline data associated with the respective account of the account holder. If decline data is located, the decline data indicates that a transaction was declined, indicates at least one decline code and indicates when the transaction was declined. The decline code provides a reason why the attempted transaction was declined. Alternatively, decline data can be stored with account data so that when account data is retrieved by processing unit 115 upon identifying the account holder, decline data is immediately available to processing unit 115. Such decline data associated with an account indicates to processing unit 115 that a likely reason for the account holder contacting voice response unit 110 is the recent transaction decline. In addition, processing unit 115 determines whether the transaction was declined within the predetermined period of time before the present call. In particular, processing unit 115 compares the retrieved decline data indicating when the respective transaction was declined with data indicating the predetermined period of time. Based on the retrieved data, processing unit 115 determines whether the transaction was declined within the predetermined period of time, for instance, within twenty-four hours, of the present call by the account holder.

If processing unit 115 determines that a transaction was declined within a predetermined period of time, in 215, processing unit 115 then determines the reason for the transaction being declined, in 220. Specifically, processing unit 115 searches a table of codes stored, for example, in memory unit 125 for the decline code associated with the declined transaction. The appropriate entry in the table of codes for the respective decline code indicates to processing unit 115 the reason for the transaction being declined and/or the action or actions to be performed due to the reason for the decline. The actions or actions to be performed can, however, be stored in a relational database. In an alternate embodiment, routing flags are set for routing purposes. For example, if voice response unit 110 and/or processing unit 115 attempt to automate a particular decline code and are unsuccessful, voice response unit 110 and/or processing unit 115 conduct routing based off the flag set.

Based on the reason for the recent transaction being declined and, more particularly, based on the stored action or actions to be performed due to the reason, the account holder is routed to a predetermined path or a plurality of predetermined paths of at least one automated message by processing unit 115 via voice response unit 110, in 225. The account holder may have the option to make one or more selections to navigate along different paths of automated messages depending on the reason for the declined transaction. The automated message(s) along the predetermined path(s) are arranged so as to answer any questions, address any concerns the account holder may have regarding the declined transaction and to offer the account holder one or more services related to the reason for the transaction being declined. If need be, the account holder can speak with customer service representative 140. In an exemplary embodiment, a customer service representative is selected by processing unit 115 based at least on the decline code so that the appropriate customer service representative is chosen to speak with the account holder.

For instance, after identifying an account holder, processing unit 115 determines according to decline data that a transaction associated with an account holder's account was declined ten hours ago because of insufficient funds. One or more predetermined messages are provided to the account holder, and other account holders who had transactions declined for the same reason, based on the specific reason for the decline, that is, insufficient funds. The automated messages inform the account holder of the reason for the declined transaction and provide other information to the account holder. The other information can be, for instance, an offer to increase the account holder's respective credit limit so to help prevent a similar decline in the future. Some of the automated messages in the predetermined path or paths can also be unrelated to the reason for the transaction decline. If an account holder contacted voice response unit 110 for a reason unrelated to the recent transaction decline or an additional reason, the account holder can make the appropriate selections while interacting with voice response unit 110 to have the question answered by automated messages or speak with customer service representative 140.

The embodiments described above are illustrative examples of the present invention and it should not be construed that the present invention is limited to these particular embodiments. Various changes and modifications may be effected by one skilled in the art without departing from the spirit or scope of the invention as defined in the appended claims.

What is claimed is:

1. A call routing method, the call routing method comprising:

identifying an account holder accessing a voice response unit, the account holder having an account;

determining whether a transaction associated with the account was declined within a predetermined period of time, after determining the identity of the account holder, by searching at least one memory unit for first data associated with the account indicating whether the transaction was declined and, if the transaction was declined, indicating when the transaction was declined, searching the at least one memory unit for second data indicating the predetermined period of time, if the transaction was declined, and determining according to the first data and the second data whether the transaction was declined within the predetermined period of time;

determining a reason for the transaction being declined if the transaction associated with the account was determined to be declined within the predetermined period of time; and routing the account holder to at least one predetermined automated message provided by the voice response unit based on the reason for the transaction being declined, wherein the at least one predetermined automated message informs the account holder of the reason for the transaction being declined.

2. The call routing method as set forth in claim 1, wherein identifying the account holder accessing the voice response unit includes requesting the account holder to input an account number and matching the inputted account number to one of a plurality of account numbers stored in at least one memory unit.

3. The call routing method as set forth in claim 1, further comprising determining when the account holder accessed the voice response unit, and determining according to the first data and the second data whether the transaction was declined within the predetermined period of time of when the account holder accessed the voice response unit.

4. The call routing method as set forth in claim 1, wherein determining a reason for the transaction being declined includes searching at least one memory unit for decline data includes a decline code, the decline data being associated with account data for the account holder and the decline code indicating the reason for the transaction being declined.

5. The call routing method as set forth in claim 1, wherein the at least one predetermined automated message informs the account holder of at least one service related to the reason for the transaction being declined.

6. A call routing method, the call routing method comprising:

identifying an account holder accessing a voice response unit, the account holder having an account;

determining whether a transaction associated with the account was declined within a predetermined period of time, after determining the identity of the account holder, by determining when the account holder accessed the voice response unit, searching at least one memory unit for first data associated with the account indicating whether the transaction was declined and, if the transaction was declined, indicting when the transaction was declined, searching the at least one memory unit for second data indicating the predetermined period of time, and determining according to the first data and the second data whether the transaction was declined within the predetermined period of time of when the account holder accessed the voice response unit;

determining a reason for the transaction being declined if the transaction associated with the account was determined to be declined within the predetermined period of time by searching at least one memory unit for decline data includes a decline code, the decline data being associated with account data for the account holder and the decline code indicating the reason for the transaction being declined; and routing the account holder to at least one predetermined automated message provided by the voice response unit based on the reason for the transaction being declined, wherein the at least one predetermined automated message informs the account holder of the reason for the transaction being declined.

7. A call routing system, comprising:

a communication device operable by an account holder having an account;

a voice response unit coupled to the communication device for interacting with the account holder when using the communication device;

a memory unit for storing account data, decline data and data indicating a predetermined period of time; and a processing unit coupled to the voice response unit and coupled to the memory unit, the processing unit determining the identity of the account holder according to an inputted account number and the account data stored in the memory unit, searching the memory unit for the decline data associated with the account, the decline data indicating whether a transaction was declined and, if the transaction was declined, indicating when the transaction was declined, searching the memory unit for the predetermined period of time, if the transaction was declined, determining if the transaction associated with the account was declined within the predetermined period of time according to the decline data, determining a reason for the transaction being declined according to a decline code of the decline data, and instructing the voice response unit to provide at least one predetermined automated message to the account holder if it is determined that the transaction was declined, wherein the at least one predetermined automated message informs the account holder of the reason for the transaction being declined.

8. A call routing method, the call routing method comprising:

identifying an account holder accessing a voice response unit, the account holder having an account;

determining whether a transaction associated with the account was declined within a predetermined period of time, after determining the identity of the account holder, the transaction being one of with a merchant and at an automated teller machine, by searching at least one memory unit for first data associated with the account indicating whether the transaction was declined and, if the transaction was declined, indicating when the transaction was declined, searching the at least one memory unit for second data indicating the predetermined period of time, if the transaction was declined, and determining according to the first data and the second data whether the transaction was declined within the predetermined period of time;

determining a reason for the transaction being declined if the transaction associated with the account was determined to be declined within the predetermined period of time; and routing the account holder to at least one predetermined automated message provided by the voice response unit based on the reason for the transaction being declined, wherein the at least one predetermined automated message informs the account holder of the reason for the transaction being declined.

9. The call routing method as set forth in claim 6, wherein the transaction being one of with a merchant and at an automated teller machine.

10. The call routing system as set forth in claim 7, wherein the transaction being one of with a merchant and at an automated teller machine.

11. A method for providing account information to account holders using a voice response unit, the method comprising:

receiving an incoming call from an account holder, the account holder having at least one account;

accessing transaction information from the at least one account;

identifying one or more declined transactions from the transaction information, the one or more declined transactions having occurred within a predetermined time prior to receiving the incoming call; and selecting a predetermined message to be provided by the voice response unit based on the one or more declined transactions, wherein determining whether the one or more declined transactions occurred within the predetermined period of time includes searching at least one memory unit for first data associated with the account indicating whether the transaction was declined and, if the transaction was declined, indicting when the transaction was declined, searching the at least one memory unit for second data indicating the predetermined period of time, if the transaction was declined, and determining according to the first data and the second data whether the declined transaction occurred within the predetermined period of time.

12. The method as set forth in claim 11, further comprising:

determining a reason that the one or more declined transactions were declined, wherein selecting a predetermined message is based upon the determined reason.

13. The method as set forth in claim 12, wherein the predetermined automated message informs the account holder of the reason for the transaction being declined.

14. A call routing method, comprising:

receiving a call from an account holder;

determining whether a previous transaction request associated with an account of the account holder was declined within a predetermined period of time of the call;

automatically identifying the reason for the call as being for finding out why the previous requested transaction was declined, if it is determined that the previous transaction request was declined within the predetermined period of time; and automatically routing the account holder to at least one predetermined automated message providing at least one reason of why the previous request transaction was declined, the automatically routing performed as a result of the automatically identifying the reason for the call, wherein determining whether the previous transaction request was declined within the predetermined period of time includes searching at least one memory unit for first data associated with the account indicating when the previous transaction request was declined, searching the at least one memory unit for second data indicating the predetermined period of time, if the previous transaction request was declined, and determining according to the first data and the second data whether the previous transaction request was declined within the predetermined period of time.

* * * * *